US012700268B2

(12) United States Patent
Takasawa et al.

(10) Patent No.: US 12,700,268 B2
(45) Date of Patent: Aug. 4, 2026

(54) INFORMATION PROCESSING DEVICE, INFORMATION PROCESSING METHOD, AND INFORMATION PROCESSING PROGRAM

(71) Applicant: BRIDGESTONE CORPORATION, Tokyo (JP)

(72) Inventors: Yuya Takasawa, Tokyo (JP); Thierry Jakircevic, Tokyo (JP)

(73) Assignee: BRIDGESTONE CORPORATION, Tokyo (JP)

( * ) Notice: Subject to any disclaimer, the term of this patent is extended or adjusted under 35 U.S.C. 154(b) by 28 days.

(21) Appl. No.: 18/850,054

(22) PCT Filed: Mar. 10, 2023

(86) PCT No.: PCT/JP2023/009454
§ 371 (c)(1),
(2) Date: Sep. 24, 2024

(87) PCT Pub. No.: WO2023/189444
PCT Pub. Date: Oct. 5, 2023

(65) Prior Publication Data
US 2025/0218229 A1     Jul. 3, 2025

(30) Foreign Application Priority Data
Mar. 31, 2022    (JP) ................................. 2022-061174

(51) Int. Cl.
*G07C 5/00*      (2006.01)
*B60C 11/24*     (2006.01)
*B60C 23/04*     (2006.01)

(52) U.S. Cl.
CPC ............ *G07C 5/008* (2013.01); *B60C 11/243* (2013.01); *B60C 23/0479* (2013.01)

(58) Field of Classification Search
CPC ... G07C 5/008; B60C 11/243; B60C 23/0479; B60C 11/246; G06Q 10/20; G06Q 50/40
See application file for complete search history.

(56) References Cited

U.S. PATENT DOCUMENTS

2018/0096542 A1     4/2018    Mader et al.
2019/0084355 A1     3/2019    Mcpillan et al.
(Continued)

FOREIGN PATENT DOCUMENTS

JP          H08-16954 A       1/1996
JP          2002-131191 A     5/2002
(Continued)

OTHER PUBLICATIONS

Machine Translation of JP-2019182330-A (Year: 2019).*
International Search Report issued in International Application No. PCT/JP2023/009454 on May 16, 2023.

*Primary Examiner* — Alan D Hutchinson
(74) *Attorney, Agent, or Firm* — SOLARIS Intellectual Property Group, PLLC

(57) ABSTRACT

An information processing device including an acquisition section that acquires values of plural tire related parameters related to a structure of a tire attached to a moving body, and a control section that, in cases in which at least one value of the tire related parameters is a specific value predetermined as a tire state indicating a structure of the tire has changed, performs control based on each value of the acquired plural tire related parameters to output instruction information indicating an instruction for the tire predetermined according to the tire state.

15 Claims, 7 Drawing Sheets

(56)        References Cited

U.S. PATENT DOCUMENTS

2021/0166503 A1     6/2021   Shimomura et al.
2021/0257931 A1     8/2021   Sugimoto et al.

FOREIGN PATENT DOCUMENTS

| | | | | |
|---|---|---|---|---|
| JP | 2007-112169 | A | 5/2007 | |
| JP | 2021-067533 | A | 4/2011 | |
| JP | 2011-242133 | A | 12/2011 | |
| JP | 2019182330 | A * | 10/2019 | .............. H04Q 9/00 |
| JP | 2020-152171 | A | 9/2020 | |
| JP | 2021-129464 | A | 9/2021 | |
| WO | 2007/145252 | A1 | 12/2007 | |

* cited by examiner

FIG.10

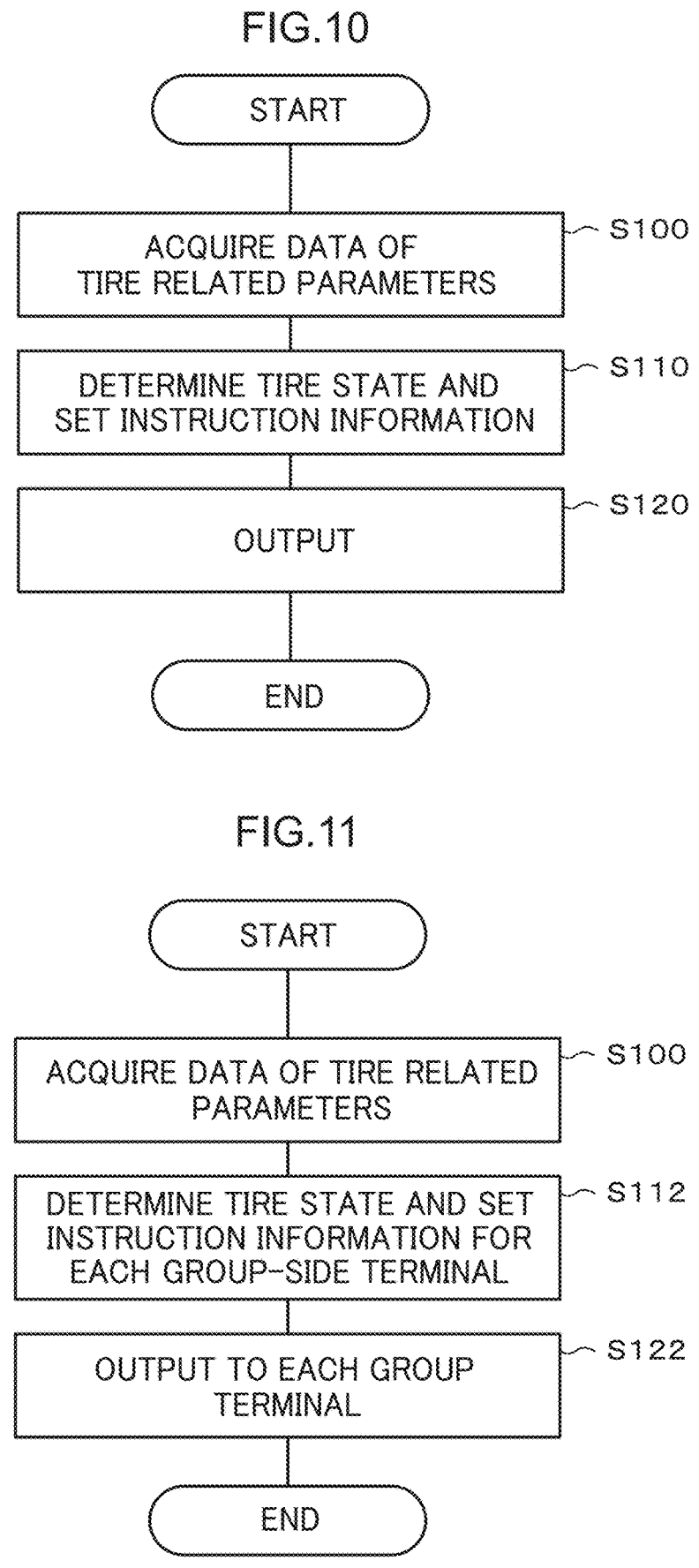

```
          ┌─────────────┐
          │    START    │
          └─────────────┘
                 │
   ┌─────────────────────────────┐
   │      ACQUIRE DATA OF         │ ── S100
   │   TIRE RELATED PARAMETERS    │
   └─────────────────────────────┘
                 │
   ┌─────────────────────────────┐
   │   DETERMINE TIRE STATE AND   │ ── S110
   │  SET INSTRUCTION INFORMATION │
   └─────────────────────────────┘
                 │
   ┌─────────────────────────────┐
   │           OUTPUT            │ ── S120
   └─────────────────────────────┘
                 │
          ┌─────────────┐
          │     END     │
          └─────────────┘
```

FIG.11

```
          ┌─────────────┐
          │    START    │
          └─────────────┘
                 │
   ┌─────────────────────────────┐
   │  ACQUIRE DATA OF TIRE RELATED│ ── S100
   │          PARAMETERS          │
   └─────────────────────────────┘
                 │
   ┌─────────────────────────────┐
   │   DETERMINE TIRE STATE AND SET│ ── S112
   │  INSTRUCTION INFORMATION FOR  │
   │    EACH GROUP-SIDE TERMINAL   │
   └─────────────────────────────┘
                 │
   ┌─────────────────────────────┐
   │     OUTPUT TO EACH GROUP     │ ── S122
   │           TERMINAL           │
   └─────────────────────────────┘
                 │
          ┌─────────────┐
          │     END     │
          └─────────────┘
```

INFORMATION PROCESSING DEVICE, INFORMATION PROCESSING METHOD, AND INFORMATION PROCESSING PROGRAM

TECHNICAL FIELD

The present disclosure relates to an information processing device, an information processing method, and an information processing program.

BACKGROUND ART

In hitherto known technology, air pressure of a tire is detected using a sensor, and the tire is managed using the detected air pressure. For example, there is a proposal for a system in which a sensor for detecting pressure of tires is attached to a tire interior, and a warning is issued in cases in which there is an abnormality in the air pressure (see for example International Publication (WO) No. 2007/145252).

SUMMARY OF INVENTION

Technical Problem

However, although the air pressure of a tire is an important parameter for confirming a tire state, tire states are not only the tire air pressure, but also include tire structure parameters such as a cut, depth of groove, and the like. There is a need to identify the tire state from these plural parameters. For a tire state identified by plural parameters in this manner, sometimes a response to the tire is different according to the identified tire state. For example, sometimes a different response is needed according to each of different types of tire state. However, determining which response is appropriate according to the tire state is not easy even when the tire state has been identified. For example, identifying which parameter should be prioritized, which combination of parameters should be considered, what level of value should be determined for a parameter, and what relationship there is between determination standard and parameter, is difficult. Moreover, although responding to a tire according to tire state is possible for an experienced operator, responding to all tires using an experienced operator is difficult, and is not desirable from a practical perspective. There is accordingly room for improvement in responding to tires according to tire state.

In consideration of the above circumstances, the present disclosure considers plural tire related parameters related to a tire structure, and provides an appropriate instruction for a tire according to a tire state.

Solution to Problem

A first aspect of the present disclosure is an information processing device including an acquisition section that acquires values of plural tire related parameters related to a structure of a tire attached to a moving body, and a control section that, in cases in which at least one value of the tire related parameters is a specific value predetermined as a tire state indicating a structure of the tire has changed, performs control based on each value of the acquired plural tire related parameters to output instruction information indicating an instruction for the tire predetermined according to the tire state.

BRIEF DESCRIPTION OF DRAWINGS

FIG. 10 is a flowchart illustrating an example of a flow of server processing according to the first exemplary embodiment.

FIG. 11 is a flowchart illustrating an example of a flow of server processing according to a second exemplary embodiment.

DESCRIPTION OF EMBODIMENTS

Figure 1:
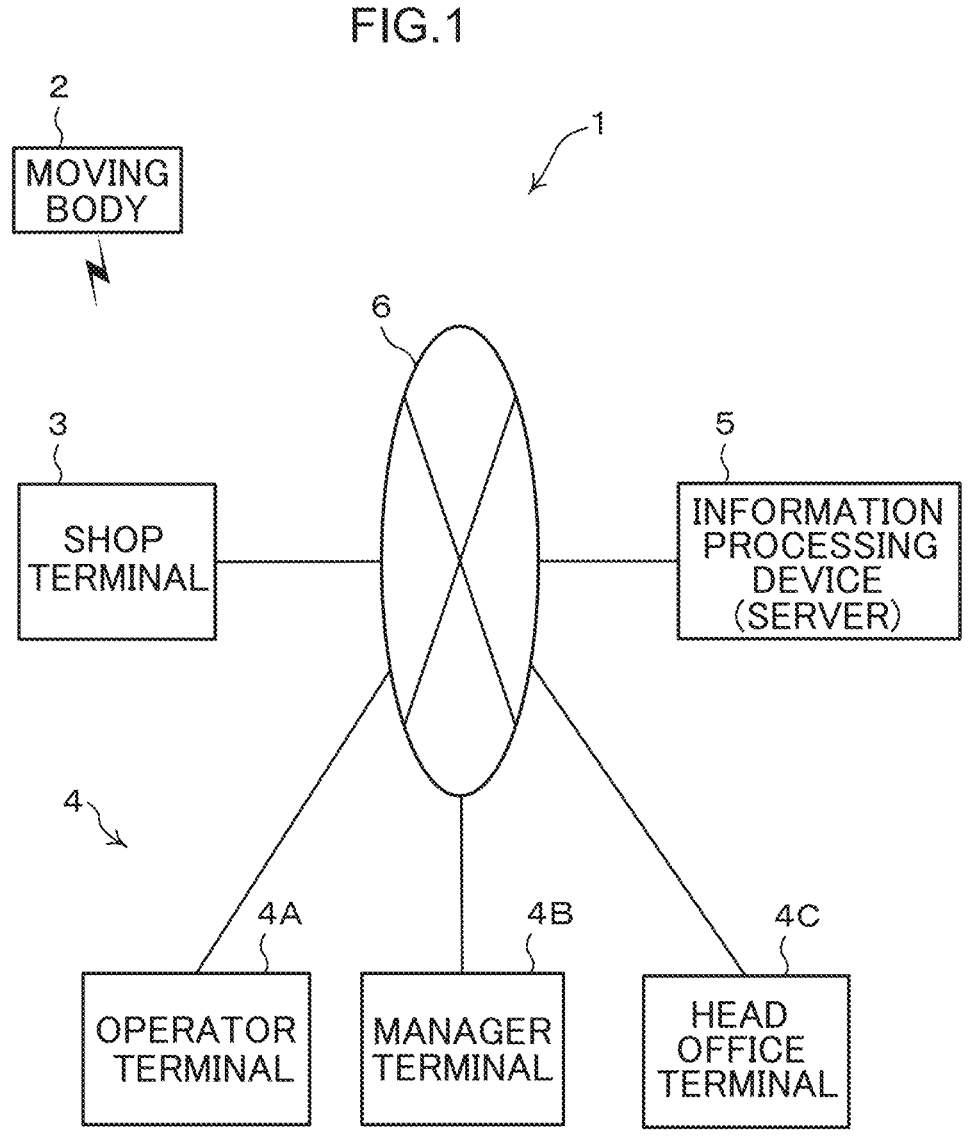
FIG. 1 is a block diagram illustrating a schematic configuration of an information processing system according to an exemplary embodiment.

Detailed description follows regarding exemplary embodiments for implementing technology disclosed herein, with reference to the drawings.

Note that the same reference numerals will be appended in the drawings to configuration elements and processing that act to perform the same operation and function, and sometimes duplicated explanation thereof will be omitted as appropriate. Moreover, the present disclosure is not limited by any of the following exemplary embodiments, and appropriate modifications may be implemented thereto within a range of the object of the present disclosure.

Information Processing System

FIG. 1 illustrates a schematic configuration of an information processing system 1 according to an exemplary embodiment. The information processing system 1 is a system that collects information related to tires mounted to a moving body 2, such as a car, and that performs processing related to a tire state indicating a state of the tire. As illustrated in FIG. 1, the information processing system 1 includes a shop terminal 3, a group-side terminal 4, and a server device (hereafter also referred to as a "server") 5 that operates as an information processing device according to an exemplary embodiment. Note that the group-side terminal 4 includes one or more terminals provided to a group, such as in a business of the same transport company or the like. The example illustrated in FIG. 1 includes an operator terminal 4A utilized by a user who performs an operation related to a tire, a manager terminal 4B utilized by a user who manages an operation, and a head office terminal 4C utilized by a user in head office to manage operations and the like within the group.

The server 5 is an example of an information processing device of the present disclosure.

The shop terminal 3, the group-side terminal 4, and the server 5 are connected together over a network 6. The network 6 is a freely selected network such as a communication line capable of either wired connection or wireless connection, for example, a LAN, WAN, the internet, or an Ethernet WAN or the like.

Note that the information processing system 1 may be implemented including a configuration of a network environment containing a virtual network in virtual space, the so-called cloud, in which part of the network and part or all devices are virtual. For example, the server 5 may be formed in virtual space, the so-called cloud, with a client terminal known as a client-server system connected to the server 5 over the network 6 and operating the server 5. Moreover, in order to provide redundancy in the information processing system 1, plural servers 5 may be connected over a network.

Moreover, FIG. 1 illustrates an example in which the shop terminal 3 is connected to the network 6. In the present disclosure, there is no limitation to a single shop terminal 3 being connected to a network, and plural terminal devices may be connected as the shop terminal 3. Moreover as the group-side terminal 4 containing one or more terminals, an example is illustrated that is equipped with the operator terminal 4A, the manager terminal 4B, and the head office terminal 4C. In the present disclosure there is no limitation to the operator terminal 4A, the manager terminal 4B, and the head office terminal 4C as the one or more terminal, and the one or more terminal may be any one terminal, or plural connected terminal devices. Furthermore, FIG. 1 illustrates an example in which the group-side terminal 4 is connected to the network 6. The present disclosure is not limited to a group-side terminal 4 of a single group being connected to a network as the group-side terminal 4, and independent or interrelated terminal devices belonging to each group from plural groups may be connected.

"Tire" in the present disclosure is an elastically deformable member attached to a moving body such as a car, and the meaning thereof encompasses a member attachable to and detachable from the moving body. "Tire related parameters" are an example of a physical quantity indicating a tire state to identify a structure of the tire, and encompasses internal pressure such as air pressure and temperature of the tire. The internal pressure such as tire air pressure includes a pressure change quantity and a rate of pressure change. Moreover, the tire related parameter encompasses a shape, a size such as width, and a depth of grooves formed in the tire, a cut occurring in the tire, and a level of wear of the tire tread section, such as uneven wear or the like. Furthermore, the tire related parameter also encompasses valve related information such as information indicating whether or not a valve is attached to the tire, and a physical quantity indicating extension of a valve.

Moving Body

Figure 2:
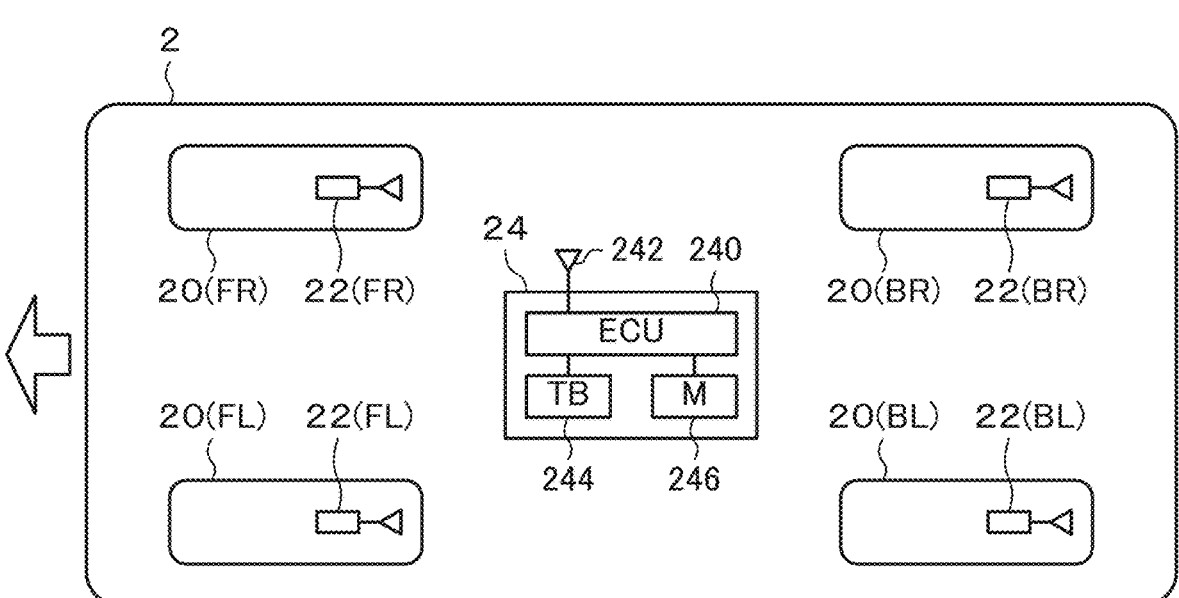
FIG. 2 is a block diagram of a moving body.

FIG. 2 illustrates an example of a moving body 2 that is the target for collection of information related to tires. FIG. 2 schematically illustrates a configuration including an onboard device 24 for collecting the information related to tires.

The onboard device 24 for collecting information related to tires is installed to the moving body 2. The onboard device 24 acquires tire information from sensor modules 22. The tire information is information containing the tire related parameters and indicating a tire state to identify a structure of a tire. An example of tire information is internal pressure, such as tire air pressure. The following description describes a case in which at least tire air pressure is acquired as tire information. The sensor modules 22 are attached to each wheel 20 of the moving body 2, and measure tire air pressure of the wheel 20 and transmits data of the measured air pressure to the onboard device 24. Note that in FIG. 2 reference numerals are appended to the wheels 20 and the sensor modules 22 according to their positions on the moving body 2. Namely, front right in the direction of progression of the moving body 2 is indicated by (FR), the front left side thereof is indicated by (FL), the back right is indicated by (BR), and the back left side is indicated by (BL). The following description describes a case in which reference numerals are appended according to position on the moving body 2, however in other cases they are referred to collectively as wheels 20 and sensor modules 22.

The onboard device 24 performs control to acquire data of tire air pressure sent from each of the sensor modules 22, and to record the data of tire air pressure for each of the mounting positions of the tires. The onboard device 24 includes an electronic control unit (ECU) 240, a reception unit 242, a correspondence table memory 244, and a log memory 246. The reception unit 242 receives information from the sensor module 22. The correspondence table memory 244 is memory stored with a correspondence table that associates tire mounting positions with unique identification codes of each of the sensor modules 22 (hereafter also referred to as sensor identification codes). The log memory 246 is memory successively recorded as a log with information from the sensor modules 22 (for example tire air pressure data). Note that the onboard device 24 is able to output recorded data (for example tire air pressure data) to outside the moving body 2 (omitted in the drawings).

Note that in the present exemplary embodiment a case is described in which the onboard device 24 acquires and records data from the sensor modules 22, and the data is output to outside the moving body 2, however the present disclosure is not limited thereto. For example, instead of via the onboard device 24, this data may be output directly to an external device such as the server 5 over the network 6. In such cases, a configuration may be adopted in which the correspondence table related to the sensor modules 22 is not stored in the onboard device 24, and is instead stored in a device (for example, the server 5 or the like) contained in the information processing system 1.

The following Table 1 illustrates an example of a correspondence table stored in the correspondence table memory 244 of the onboard device 24 of the four-wheeled moving body 2. In Table 1 the mounting positions of the tires are denoted as tire positions, and the sensor identification codes are denoted as sensor IDs. Moreover, Table 1 is an example of a correspondence table in which information indicating tire type (TY) and information indicating latest tire state (for example, tire air pressure data) is associated, as information related to each tire indicated by a sensor identification code (sensor ID), with the sensor identification codes (sensor IDs).

TABLE 1

| | Tire | | |
|---|---|---|---|
| Sensor id | Tire position | Tire type | Tire state |
| SID01 | front right | TY1 | J1 |
| SID02 | front left | TY1 | J2 |
| SID03 | back right | TY1 | J3 |
| SID04 | back left | TY1 | J4 |

The tire information sent from the sensor modules 22 (for example, tire air pressure data) is, as described later, appended with the sensor identification codes, and the ECU 240 is able to identify tires from the received information, by discriminating tires of the same vehicle and the position where the tire is mounted, and by discriminating as to whether or not there is a match to sensor identification codes stored in advance in the correspondence table. The information sent from the sensor modules 22 is appended with time information and recorded in the log memory 246.

Figure 3:
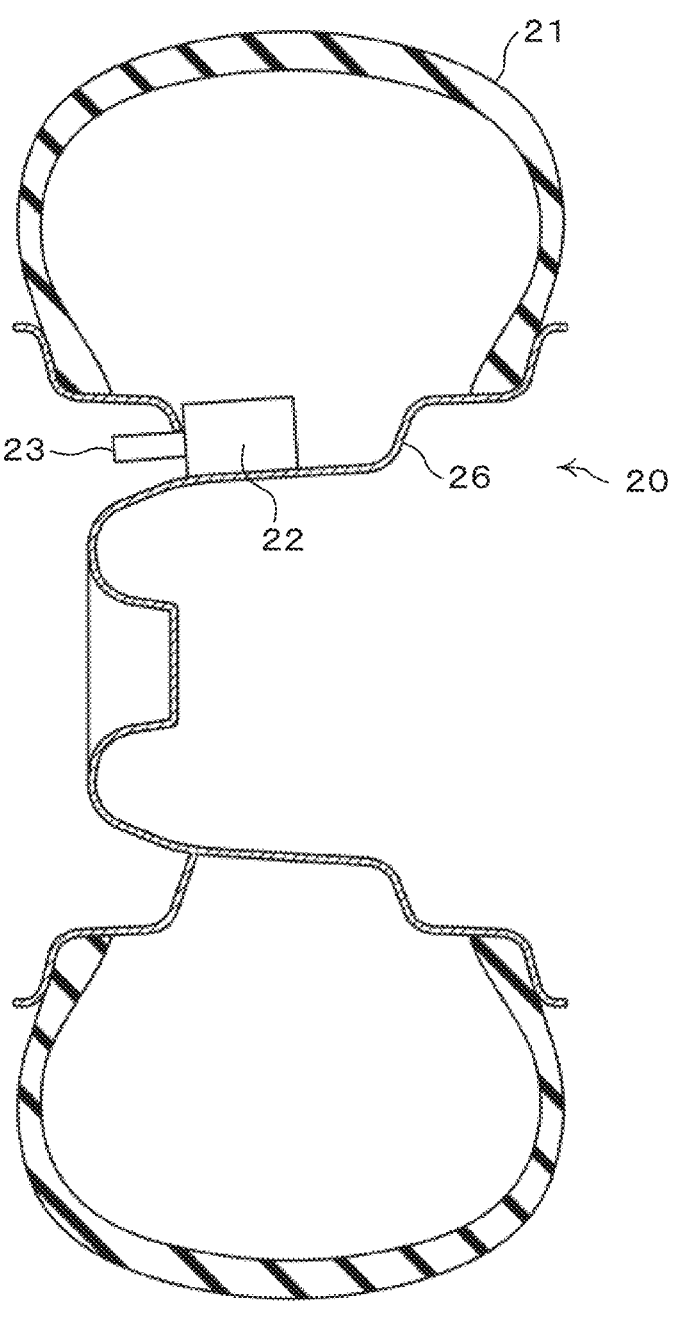
FIG. 3 is a cross-section illustrating an attached state of a sensor module to a wheel.
Figure 4:
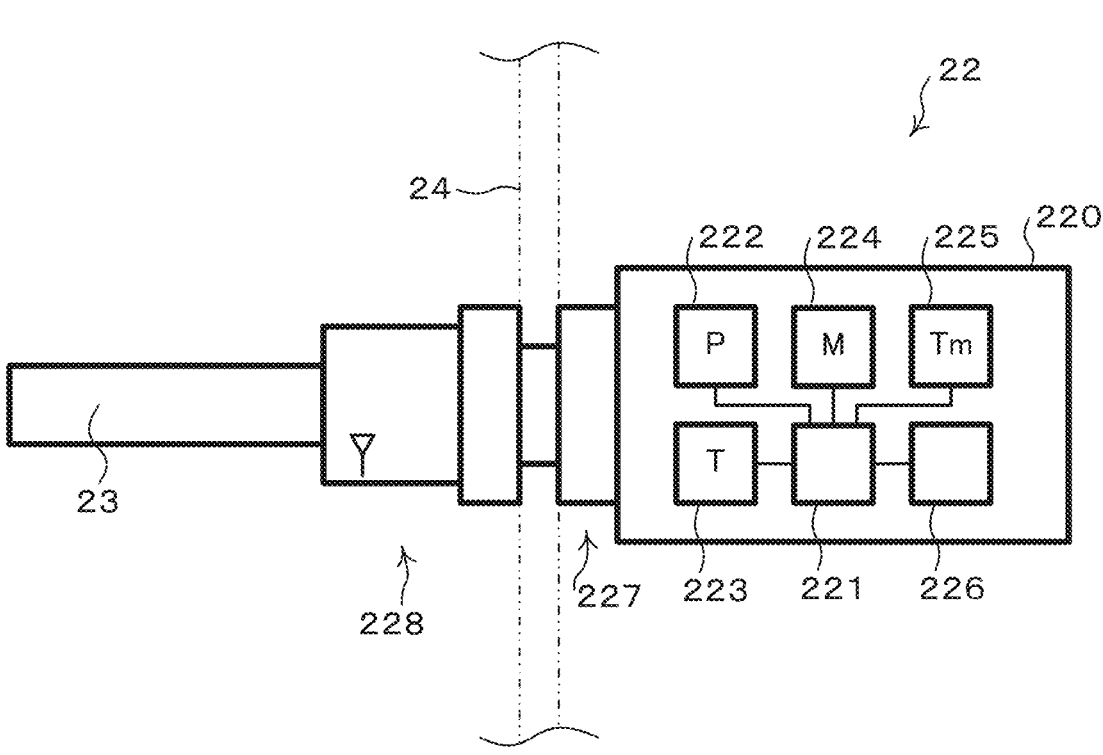
FIG. 4 is a block diagram illustrating a schematic configuration of a sensor module.

FIG. 3 and FIG. 4 illustrate an example of a configuration of the sensor module 22.

As illustrated as a cross-section of the wheel in FIG. 3, the sensor module 22 is attached to a wheel rim 26 that is integrated together with a circular cylindrical shaped tire valve 23 for injecting air into a tire 21. Note that the sensor module 22 is attached by fusing to an inner face of the rim, and preferably is provided so as not to separate from the rim or break even when the tire deforms under load during running. The sensor module 22 may also be retained in the tire internal space using a separate means.

As illustrated by the external profile of the sensor module 22 in FIG. 4, the sensor modules 22 are each configured including a sensor module body 220 provided with a data write terminal 226 for writing externally sourced data, a rim attachment portion 227, and an antenna 228, with the sensor module 22 integrated together with the tire valve 23 and attached to the wheel rim 26.

The sensor module body 220 has an inbuilt electrical circuit device including a controller 221, a pressure sensor 222, a temperature sensor 223, a re-writable memory (for example EPROM) 224, a transmitter 225, and a data writing terminal 226. The controller 221 includes a function to perform control related to the sensor module 22. The pressure sensor 222 includes a function to detect tire air pressure, and the temperature sensor 223 includes a function to detect tire internal temperature. The re-writable memory 224 stores a tire mounting position and a unique identification code of the sensor module 22. The transmitter 225 converts an output signal from the controller 221 into a transmission signal to transmit from the antenna 228, and outputs this to the antenna 228. Note that the temperature sensor 223 is an example of a sensor for acquiring a tire state other than tire air pressure, and is not always essential.

The controller 221 imports pressure data and temperature data detected by the pressure sensor 222 and the temperature sensor 223, and matches the sensor identification code data stored in advance in the re-writable memory 224 with the pressure data and the temperature data, and outputs these to the transmitter 225 at a specific timing of a specific cycle.

The sensor module body 220 includes the data writing terminal 226 for inputting a signal from outside, and the controller 221 is able to write data of the tire mounting position and the sensor identification code, which were input from a dedicated writing device (omitted in the drawings) connected to the data writing terminal 226, by writing to the re-writable memory 224.

Terminal

Next, description follows regarding an example of a configuration of a terminal in the information processing system 1 according to an exemplary embodiment.

Figure 5:
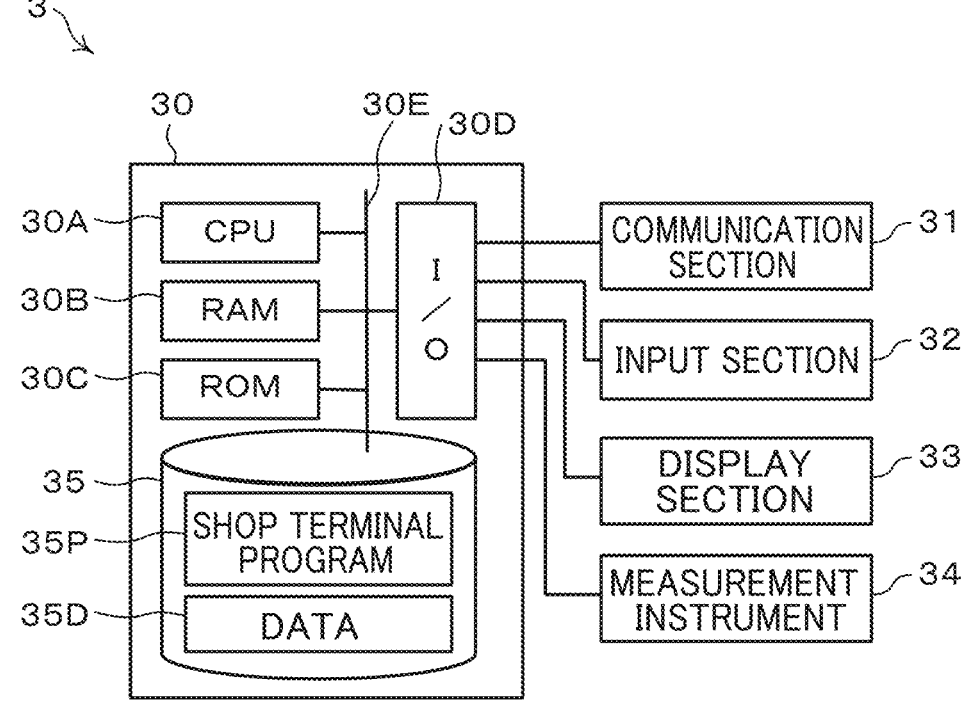
FIG. 5 is a block diagram illustrating an example of an electric configuration of a shop terminal.

FIG. 5 is an example of a configuration of the shop terminal 3.

The shop terminal 3 is a terminal device provided in a shop that performs processing on a tire state of a tire attached to the moving body 2, such as a car. A user operates the shop terminal 3 to perform an operation on the tire based on information related to tires indicating the tire state of the tire at the point in time when an operation was started on the operation target. The shop terminal 3 transmits the tire related information to the server 5, and receives a response from the server 5. Note that a general purpose computer device such as a personal computer (PC) is applicable as the shop terminal 3.

The shop terminal 3 includes a computer body 30, and the computer body 30 is equipped with a CPU 30A, RAM 30B, ROM 30C, and an I/O 30D, with these connected to each other through a bus 30E. An auxiliary storage device 35 is connected to the bus 30E, with the auxiliary storage device 35 implementable by a HDD, non-volatile flash memory, or the like. A communication section 31 that communicates with external devices, an input section 32 for a user to input data through, and a display section 33 for a user to confirm data on, are also each connected to the I/O 30D.

A shop terminal program 35P may be stored on the auxiliary storage device 35. In the shop terminal 3, the shop terminal program 35P is read from the auxiliary storage device 35, and expanded in the RAM 30B where the processing thereof is executed. By doing so, the shop terminal 3 executing the shop terminal program 35P operates as a device to perform processing according to the tire state of the tire in the shop. Note that the shop terminal program 35P may be provided on a recording medium such as a CD-ROM or the like.

Moreover, various data 35D utilized in the shop terminal 3 are stored on the auxiliary storage device 35.

The communication section 31 is able to acquire tire information (a value of a tire related parameter), namely tire air pressure data, recorded on the onboard device 24 either by wired connection or wireless connection to the onboard device 24 of the moving body 2.

A measurement instrument 34 that measure a tire state is connectable to the I/O 30D. The measurement instrument 34 is a measurement device for measuring a value of a tire related parameter expressed as a physical quantity indicating a tire structure. Examples of the measurement instrument 34 include an air pressure gauge that measures air pressure of a tire, and a temperature gauge that measures temperature of a tire. Other examples of the measurement instrument 34 includes a groove measurement device that measures a profile of grooves provided in a tire, size of groove width and depth, and a cut measurement device that measures a cut occurring in a tire. A wear level measurement device that measures a level of wear of a tire tread section, such as uneven wear, may also be applied. Furthermore, a valve related information measurement device that measures valve related information, such as information indicating the presence or absence of a valve attached to a tire, and a physical quantity indicating extension of a valve may also be applied.

Connecting a measurement instrument 34 to the shop terminal 3 is not always essential. For example, instead of using a measurement instrument 34, a user may measure the tire state and input this through the input section 32.

The following Table 2 is an example of tire related parameters acquirable in the shop terminal 3. In the Table 2, tire related parameters including a tire ID (Tid) are indicated as a tire state (J). Specifically, the tire ID (Tid) is an ID to identify a tire corresponding to a sensor ID of the sensor module 22 of Table 1, and includes at least information indicating a position of mounting to the moving body 2, and may include other information such as tire type or the like. Moreover, Table 2 includes, as other tire related parameters, an air pressure (P), a rate of pressure drop (V), a groove (L) indicating grooves remaining or the like, a wear (A) indicating a wear level including uneven wear or the like, cut (C), and valve (B) indicating valve related information such as the presence or absence of a valve and extension or the like. Note that the air pressure (P) may be only the air pressure of the tire, and may be associated with a tire temperature (Tp). The tire temperature (Tp) may also be employed as an independent tire related parameter.

TABLE 2

| | Tire Related Parameter | | | | | |
| | 1 | 2 | 3 | 4 | 5 | 6 | 7 |
| --- | --- | --- | --- | --- | --- | --- | --- |
| Tire State (J) | ID (Tid) | air pressure (P) | rate of pressure drop (V) | groove (L) | wear (A) | cut (C) | valve (B) |

Figures 6, 7:
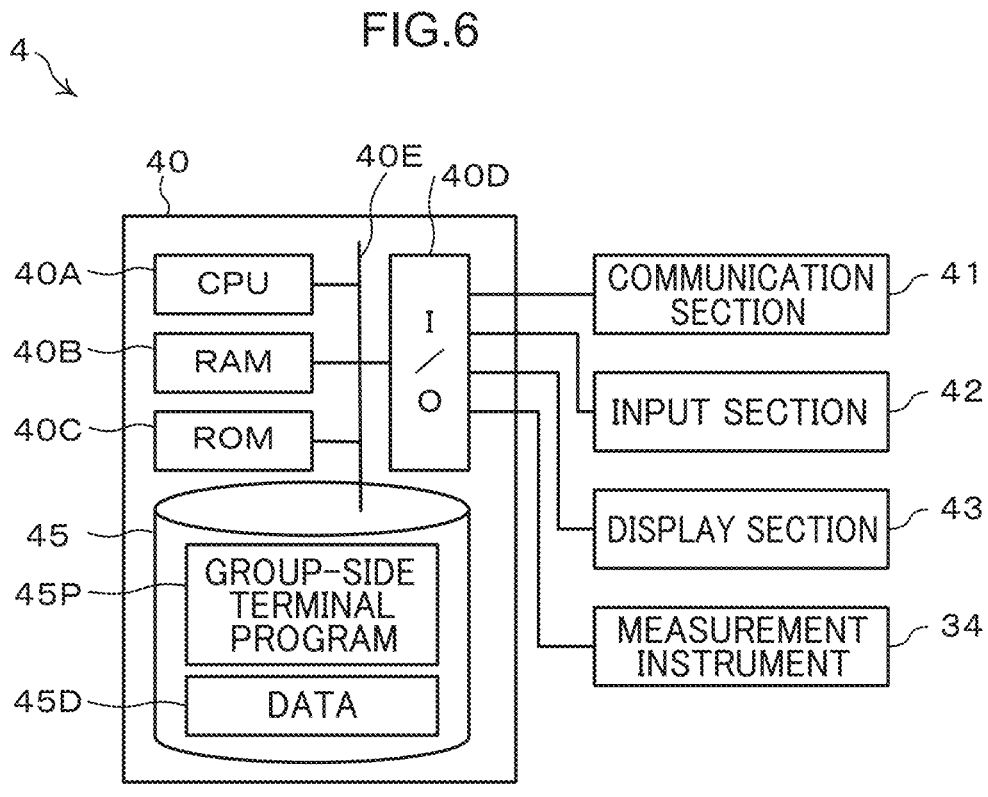
FIG. 6 is a block diagram illustrating an example of an electric connection of a group-side terminal.
FIG. 7 is a block diagram illustrating an example of an electric configuration of a server device.

FIG. 6 illustrates an example of a configuration of the group-side terminal 4.

The group-side terminal 4 may have a configuration substantially the same as that of the shop terminal 3, and includes a computer body 40. The computer body 40 includes a CPU 40A, RAM 40B, ROM 40C, and an I/O 40D, with these connected to each other through a bus 40E. An auxiliary storage device 45 is connected to the bus 40E. A communication section 41, an input section 42, and a display section 43 are each connected to the I/O 40D. A group-side terminal program 45P is storable in the auxiliary storage device 45, with the group-side terminal 4 operating as a device to perform processing according to the tire state of the tire on the group-side by the group-side terminal program 45P being read from the auxiliary storage device 45 and expanded in the RAM 40B, with processing thereof being executed therein. Note that the group-side terminal program 45P may be configured so as to be provided on a recording medium such as a CD-ROM or the like. Various data 45D employed in the terminal is stored in the auxiliary storage device 45. The communication section 41 is able to acquire tire information (values of tire related parameters). A measurement instrument 34 that measures a tire state is connectable to the I/O 40D.

Note that although in the group-side terminal 4 there is sometimes a request to connect the measurement instrument 34 to the operator terminal 4A operated by a user (operator) to perform an operation directly on a tire, there is not always such a need for the manager terminal 4B or the head office terminal 4C. This means that connection of the measurement instrument 34 can be omitted for the manager terminal 4B and the head office terminal 4C.

Server

Next, description follows regarding an example of a configuration of the server 5, with reference to FIG. 7.

The server 5 is an example of a server device connected to the network 6 and having functions to acquire tire related parameter values including tire information from a terminal (for example, the shop terminal 3 or the operator terminal 4A or the like), and to transmit instruction information including an operation instruction for the tire. The server 5 includes a computer body 50. The computer body 50 includes a CPU 50A, RAM 50B, ROM 50C, and an I/O 50D, with these connected to each other through a bus 50E. An auxiliary storage device 55 is connected to the bus 50E. A communication section 51 for communicating with devices on the network 6, an input section 52 for a user to input data, and a display section 53 are connected to the I/O 50D. Note that the input section 52 and the display section 53 are not essential configuration in cases in which the server 5 is configured operable from a non-illustrated client terminal.

Various data 55D utilized in the server 5 are stored in the auxiliary storage device 55. A table 55T indicating operation instructions for tire states and a server program 55P are stored on the auxiliary storage device 55. Note that table 55T is described later.

The server 5 reads the server program 55P from the auxiliary storage device 55 and expands and executes the processing of the server program 55P in the RAM 50B. The server 5 executing the server program 55P operates as an information processing device that outputs instruction information indicating an instruction for the tire according to information from the terminal.

Figure 8:
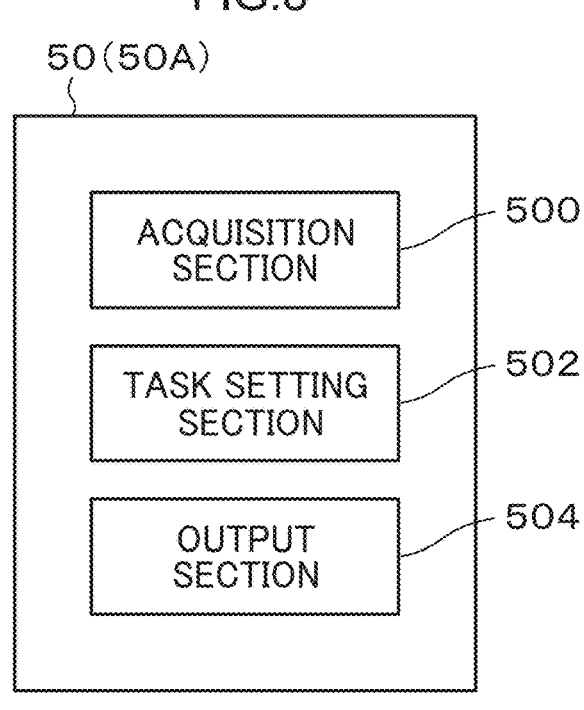
FIG. 8 is a diagram illustrating an example of a functional configuration of a server device.

FIG. 8 is a block diagram illustrating an example of a functional configuration of the server 5 according to the present exemplary embodiment.

As illustrated in FIG. 8, the CPU 50A of the server 5 functions as an information processing device of the present disclosure by executing the server program 55P. The information processing device includes functional sections that respectively function as an acquisition section 500, a task setting section 502, and an output section 504.

The acquisition section 500 is an example of an acquisition section of the present disclosure, and the task setting section 502 and the output section 504 are examples of a control section of the present disclosure.

The acquisition section 500 is a functional section that acquires values of plural tire related parameters for a tire attached to the moving body, and includes a function to acquire tire related parameter values including tire information output from a terminal such as the shop terminal 3, the operator terminal 4A, or the like. Note that acquisition of the tire related parameter values may be performed for each of the plural tires attached to the moving body 2.

The task setting section 502 is a functional section that determines a tire state of a target tire indicated by the plural tire related parameters, and sets information indicating a user operation or a user processing task for the determined tire state of the target tire. Note that determination of the tire state of the target tire is performed for each of plural tires attached to the moving body 2. Moreover, setting of information indicating a task for the target tire is performed for each of the plural tires attached to the moving body 2. The task setting section 502 may include a function that, based on each value of the plural acquired tire related parameters, determines whether or not at least one of the tire related parameters indicates a predetermined specific value as a tire state indicating the structure of the target tire has changed, for example determines whether or not a regular value within predetermined threshold values is indicated, or determines whether or not an abnormal value outside regular values (for example, a value outside threshold values, such as a value exceeding a threshold value or a value less than a threshold value) is indicated. Namely, the task setting section 502 may include each functional section of a determination section to determine from the plural tire related parameters a tire state of the target tire, such as determination that the target tire is in a normal state indicated by a regular value (for example a normal value) or an abnormal state indicated by an abnormal value, and a task setting section to set a task for a user according to the determination result.

The output section 504 is a functional section that outputs the set task information as instruction information to a terminal, namely to at least the terminal device that transmitted the plural tire related parameters.

This means that the server 5 functioning as the information processing device uses the acquisition section 500 to acquire the plural tire related parameter values related to the structure of the tires attached to the moving body, and uses the task setting section 502 and the output section 504 to perform control based on each of the acquired plural tire related parameter values and, in cases in which at least one of the tire related parameter values is a predetermined specific value as a tire state indicating a structure of the tire has changed, to output instruction information indicating an instruction for the tire predetermined according to the tire state.

The above specific value and threshold values may be specific ranges, and may be set as plural stepwise values. The above task information for output as the instruction information may be pre-set message information to enable an operation or processing by the user of the terminal receiving the task information.

The following Table 3 illustrates an example of specific values and threshold values that act as determination standards to determine tire states (J) of abnormal states. The Table 3 is pre-stored in a table 55T. The threshold values are examples of a threshold value and a determination value of the present disclosure.

TABLE 3

| | | Determination standard | | | |
|---|---|---|---|---|---|
| | | | Threshold value | | |
| | Specific value | No. 1 | No. 2 | No. 3 | Comment |
| Air pressure (P) | P0 | P1 | P2 | P3 | P1 > P2 > P3 |
| Rate of pressure drop (V) | V0 | V1 | V2 | V3 | V1 < V2 < V3 |
| Remaining grooves (L) | L0 | L1 | L2 | L3 | L1 > L2 > L3 |
| Wear (A) | present(/absent) | A1 | A2 | A3 | A1 < A2 < A3 |
| Cut (C) | present(/absent) | C1 | C2 | C3 | C1 < C2 < C3 |
| Valve (B) | (present)/absent | B1 | B2 | B3 | B1 < B2 < B3 |

In the example of Table 3, the tire state can be determined to be an abnormal state when the air pressure (P) is less than a specific value P0. Moreover, as indicated in Table 3, the determination standard may be set stepwise using plural threshold values. Specifically, an abnormality level may be set greater as the tire air pressure gets less using a first threshold value P1, a second threshold value P2, and a third threshold value P3 (P1>P2>P3). The tire state of the target tire can be identified in detail using cases in which the air pressure is less than the first threshold value P1 but at least the second threshold value P2 (P1>P≥P2) as an initial stage, cases in which the air pressure is less than the second threshold value P2 but at least the third threshold value P3 (P2>P≥P3) as a middle stage, and cases in which the air pressure is less than the third threshold value P3 as a final stage (P3>P). For example, in cases in which plural threshold values are set stepwise, corresponding values may be determined for the initial stage as a stage to warn a user of a future operation, for the middle stage as a stage when a tire check is desirable at the current point in time, and for the final stage as a stage when tire replacement is desirable. Moreover, a specific value may be set as a value predetermined as desirable according to the user operating on the target tire. Note that other tire related parameters may be set similarly. Moreover, the specific value and threshold value may be specific ranges.

Note that although a case has been described above in which the abnormality level is greater as the tire air pressure gets less, this may also encompass cases in which the abnormality level is greater as the tire air pressure gets greater. For example, a useable pressure range may be determined as the normal state for the tire air pressure, and air pressures outside this pressure range may be set as abnormal values. Moreover, setting may be performed such that the abnormality level is greater as the tire air pressure gets less, and setting may be performed such that the abnormality level is greater as the tire air pressure gets greater.

On the other hand, the tire state may be determined as an abnormal state in cases in which the rate of pressure drop (V) has exceeded a specific value V0. Moreover, the determination standard is settable stepwise using plural threshold values, and may be set as a first threshold value V1, second threshold value V2, and a third threshold value V3 (V1<V2<V3) such that the abnormality level is greater as the rate of pressure drop of the tire gets greater. Setting may be performed by employing cases in which the rate of pressure drop is greater than the first threshold value V1 and at least the second threshold value V2 (V1<V≤V2) as an initial stage, cases in which the rate of pressure drop is greater than the second threshold value V2 and at least the third threshold value V3 (V2<V≤V3) as a middle stage, and cases in which the rate of pressure drop is greater than the third threshold value V3 (V3<V) as a final stage. For example, the rate of pressure drop may be set by measuring tire states for natural pressure reductions, punctures, and the like, and using the measured values for setting.

Similarly, the tire state can be determined as an abnormal state when the groove (L) indicting remaining grooves or the like is less than a specific value L0, or may be set stepwise. Specifically, setting may be performed such that the abnormality level is greater as the grooves of the tire get less by setting a first threshold value L1, a second threshold value L2, and a third threshold value L3 (L1>L2>L3). The tire state of the target tire can be identified in detail by setting an initial stage (L1>L≥L2), a middle stage (L2>L≥L3), and a final stage (L3>L) as described above. Note that grooves indicting remaining grooves or the like are related to the level of wear, and so may be associated with wear (A).

The tire state can be determined as an abnormal state when the wear (A) indicating the level of wear including uneven wear and the like has exceeded a specific value A0, and may be set stepwise. Specifically, setting may be performed such that the abnormality level is greater as the tire wear gets greater by setting a first threshold value A1, a second threshold value A2, and a third threshold value A3 (A1<A2<A3). The tire state of the target tire can be identified in detail by setting an initial stage (A1<A≤A2), a middle stage (A2<A<A3), and a final stage (A3<A) as described above. Note that for wear, a determination result for the presence or absence of wear can be, for example, the presence of wear being cases in which a level of wear has exceeded a specific value A0, and the absence of wear being cases in which a level of wear has not exceeded the specific value A0. Moreover, uneven wear can be determined in cases in which there are differences in the level of wear across a tire width direction. The determination to determine uneven wear can be pre-set by measuring the wear level across the tire width direction in advance, and using the measurement results thereof.

For cut (C), the tire state can be determined as an abnormal state when a size of a cut occurring in the tire has exceeded a specific value C0, and can be set stepwise. Specifically, a first threshold value C1, a second threshold value C2, and a third threshold value C3 (C1<C2<C3) can be set such that the abnormality level is greater as the size of a cut occurring in the tire gets greater. The tire state of the target tire can be identified in detail by setting an initial stage (C1<C≤C2), a middle stage (C2<C≤C3), and a final stage (C3<C) as described above. Note that for cut (C), a determination result for the presence or absence of a cut can, for example, be the presence of a cut for cases in which size and depth has exceeded a specific value C0, and be the absence of a cut for cases in which a cut has not exceeded the specific value C0.

For the valve (B), the tire state can be determined as an abnormal state when valve related information of the presence or absence of a valve and a valve extension or the like in the tire has exceeded a specific value B0, and can be set stepwise. For example, a first threshold value B1, a second threshold value B2, and a third threshold value B3 (B1<B2<B3) can be set such that the abnormality level is greater as the size of an extension gets greater. The tire state of the target tire can be identified in detail by setting an initial stage (B1<B≤B2), a middle stage (B2<B≤B3), and a final stage (B3<B) as described above. Note that for the valve (B), for example, the presence or absence of a valve may be determination results of absence of a valve for cases in which a separation or a displacement amount of a valve cap from a specific position has exceeded a specific value B0, and presence of a valve for cases not exceeding the specific value B0.

Note that similarly to with tire temperature (Tp), the tire state can be determined as an abnormal state for cases in which the tire temperature has exceeded a specific value Tp0, and can be set stepwise. Moreover, for the tire temperature (Tp), a temperature range may be set as a normal state, and outside this temperature range, namely a temperature that has exceeded the temperature range and a tire temperature less than the temperature range, may be set as an abnormal state.

In the present exemplary embodiment, plural tire related parameter values are acquired, and instruction information according to the tire state is output in cases in which at least one of the tire related parameter values is a predetermined specific value. For example, whether or not there is an abnormal tire state is determined from out of the plural tire related parameters, and instruction information according to this abnormal tire state is output in cases in which there is an abnormal tire state. Following Table 4 indicates examples of instruction information. Table 4 is pre-stored in a table 55T.

TABLE 4

| | Instruction information |
|---|---|
| Air pressure | Please top up internal pressure of target tire |
| Air pressure and wear | Please replace target tire |
| Air pressure and cut | Please remove and check target tire |

The example of Table 4 includes message information of "Please top up internal pressure of target tire" when the tire state is determined to be an abnormal state when the air pressure (P) is less than the specific value P0. Moreover, Table 4 includes message information for cases in which the tire state is determined to be an abnormal state due to air pressure (P) and wear (A), and for cases in which the tire state is determined to be an abnormal state due to air pressure (P) and cut (C), as examples of using plural tire related parameters.

For example, there might be a tire state in which although a top up in internal pressure would be desirable for a value of air pressure (P), tire replacement is actually more desirable due to the progression of wear. Each of the values of air pressure (P) and wear (A) can be set by experimentation and the like performed in advance to determine abnormal states due to combinations of air pressure (P) and wear (A). Thus the tire state may be determined as an abnormal state in cases in which the tire state from combining air pressure (P) and wear (A) is less than a predetermined air pressure Pm and exceeding a predetermined wear Am, and instruction information may be output using the above message information. The air pressure Pm may use any of above values P0 to P3, and may use a different value thereto. The wear Am may also use any of above values A0 to A3, and may use a different value thereto.

Moreover, for example, in cases in which a cut has developed in the tire, sometimes there is an interrelationship between air pressure of the tire and cuts developed in the tire, such as progression of the cut being accelerated in a tire having an air pressure of less than a specific value. Each of the values of air pressure (P) and cut (C) can be set in advance by experimentation or the like to determine abnormal states due to combinations of air pressure (P) and cut (C). The tire state can be determined as an abnormal state in cases in which, a tire state from combining air pressure (P) and cut (C) is less than a predetermined air pressure Pn and exceeding a predetermined cut Cn, and instruction information may be output using the above message information. The air pressure Pn may use any of above values P0 to P3, and may use a different value thereto. Moreover, the cut Cn may also use any of above values C0 to C3, and may use a different value thereto.

Note that the examples of T4 illustrate examples of instruction information related to tire states for air pressure (P), for air pressure (P) and wear (A), and for air pressure (P) and cut (C) as examples of tire related parameters, however the tire related parameters are not limited thereto. For example, instruction information can be set for any one or more tire related parameter from out of plural tire related parameters.

Moreover, as illustrated in Table 4, instruction information that is tasks corresponding to combinations of plural tire related parameters are predetermined for plural tire related parameters. This means that even in cases in which plural tire related parameters are specific values, for example indicate an abnormal state, and even in cases in which determination of an operation or processing for the target tire is difficult on the user side, instruction information can be set that is an appropriate task to correspond to that combination of plural tire related parameters.

Information Processing

Next, description follows regarding information processing executed by the information processing system 1. Note that an example will be described here of a case in which tire related parameter data related to a target tire is acquired at the shop side, the tire related parameter data is transmitted from the shop terminal 3 to the server 5, and instruction information is output to the shop terminal 3 from the server 5.

Figure 9:
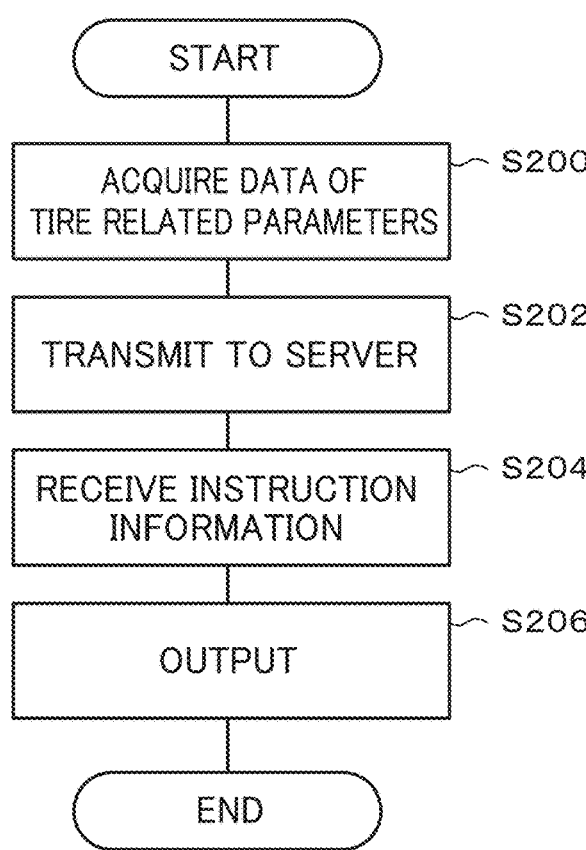
FIG. 9 is a flowchart illustrating an example of a flow of terminal processing according to a first exemplary embodiment.

FIG. 9 is a flowchart illustrating an example of a flow of terminal processing executed in the shop terminal 3. The processing routine illustrated in FIG. 9 is an example of a flow of processing of the shop terminal program 35P stored in the shop terminal 3. The processing routine illustrated in FIG. 9 is executed by the CPU 30A of the shop terminal 3.

The CPU 30A of the shop terminal 3 executes processing at step S200 to acquire tire related parameter data related to a target tire. Specifically, the CPU 30A acquires tire information that has already been recorded (namely data of tire air pressure that is a value of tire related parameter) from the onboard device 24 of the moving body 2, or tire information directly from the tire. Moreover, values of other tire related parameter are acquired from the measurement instrument 34, or values input through the input section 32 are acquired as values measured by a measurement instrument to measure tire related parameter values.

Next, at step S202, the acquired tire related parameter values are transmitted to the server 5, and then standby is adopted for a response from the server 5. When there is a response from the server 5, at step S204 the CPU 30A receives instruction information from the server 5, and at step S206 performs control to output the received information and displays this instruction information on the display section 33, and the present processing routine is then ended.

FIG. 10 is a flowchart illustrating an example of a flow of server processing executed by the server 5. The processing routine illustrated in FIG. 10 is an example of a flow of processing of the server program 55P stored in the server 5. The processing routine illustrated in FIG. 10 is executed by the CPU 50A of the server 5.

Note that the information processing illustrated in FIG. 10 is an example of an information processing method, and of processing executed by an information processing program, of the present disclosure.

The CPU 50A functions as the acquisition section 500 and is on standby for a data transmission from the shop terminal 3, and at step S100 executes processing to acquire data of tire related parameter values transmitted from the shop terminal 3. Next at step S110, functioning as the task setting section 502, processing is executed to set instruction information for the acquired data. Namely, as described above, the tire state (for example, normal state or abnormal state) of the target tire as expressed by the plural tire related parameters is determined, and instruction information is set to indicate a task for the user according to this determination result. Next at step S120, functioning as the output section 504, processing to output the instruction information, namely processing to transmit the instruction information to the shop terminal 3, is performed and the present processing routine is then ended.

Note, that a case has been described above in which, when plural tire related parameter values are specific values indicating, for example, that the tire state is an abnormal state, control is performed to output predetermined instruction information for the plural tire related parameter values. In such cases a priority rank may be predetermined for the plural tire related parameters, and instruction information may be applied that corresponds to the tire related parameter having high priority rank. Moreover, instruction information may be determined according to combinations by priority rank of plural tire related parameters, and the appropriate instruction information may be applied according to the combination by priority rank.

For example, the tire air pressure is an important parameter among tire related parameters. This means that the tire air pressure may be set to the highest priority rank from plural tire related parameters, and the other tire related parameter may be treated in parallel as having the same priority rank to each other. Due to a punctured state of a tire becoming an obstruction to movement of the moving body 2, a high priority rank may be set for a rate of pressure drop corresponding to a punctured state. Furthermore, priority ranks may be associated with grooves, wear, cut, and valve according to the materials and usage environment of the tire.

In this manner, the information processing system 1 of the present disclosure is able to instruct appropriate operation and processing according to the tire state of the target tire. Specifically, a burden for the operation and processing can be reduced compared to cases in which a user responds with operation and processing individually for each of plural tire related parameters. Namely, the server 5 acquires the plural tire related parameters from the shop terminal 3, and when one or more of the tire related parameter values is, for example, a predetermined specific value as a tire state indicating a structure of the tire has changed, performs control to output instruction information predetermined according to such a tire state. For example, in cases in which the air pressure has been determined to be abnormal, a user operation can be displayed at the side of the user terminal for each tire mounting position having abnormal tire air pressure. This thereby enables a user on the shop side to perform an operation and processing on the tire appropriate to the tire related parameters merely by transmitting the plural tire related parameters.

Moreover, as described above, in response to the plural tire related parameters, the server 5 outputs instruction information that is a task corresponding to combination of the plural tire related parameters. Thus by using the instruction information provided in response to the combination of plural tire related parameters, the user on the shop side is able to perform operation and processing for the target tire for a target tire for which an abnormal state is indicated, without hesitating to determine operation and processing according to the plural tire related parameters.

Second Exemplary Embodiment

Next description follows regarding a second exemplary embodiment. The second exemplary embodiment considers output of instruction information to plural terminal devices serving as the group-side terminal 4. Note that the second exemplary embodiment is configured substantially the same as the first exemplary embodiment, and so the same reference numerals will be appended the same parts, and detailed explanation thereof will be omitted.

Sometimes sharing information within the same group is desirable. For example, consider a case in which tire management is performed in a transport company performing tasks using the moving body 2 or the like. In such cases there is also a demand for a user who manages operations, and a user in head office who manages operations within the group, to also confirm the information for the user who performs an operation on a tire. Thus the present exemplary embodiment is applied with the technology disclosed herein to output the instruction information to each of these users. Specifically, description follows regarding an example of a case in which the tire related parameter data related to the target tire is acquired on the group side, the tire related parameter data is transmitted from the operator terminal 4A to the server 5, and instruction information is output from the server 5 to the operator terminal 4A, and to the manager terminal 4B and the head office terminal 4C.

In the present exemplary embodiment, an example will be described in which different instruction information is output by the server 5 to each of the users. Following Table 5 is an example of various information for discriminating plural users. The Table 5 is pre-stored in a table 55T of the auxiliary storage device 55 of the server 5.

TABLE 5

| No. | User name | First discriminator (attribute) | Second discriminator (belonging to) | Third discriminator (output) | User ID | Address |
|---|---|---|---|---|---|---|
| | | | User discriminators | | | |
| 1 | user A | user | shop | MG1 | IDM1 | ADD__1 |
| 2 | user B | operator | group X | MG1 | IDM1_1 | ADD__2 |
| 3 | user C | manager | group X | MG2 | IDM1_2 | ADD__3 |
| 4 | user D | head office (manager) | group X | MG3 | IDM1_3 | ADD__4 |
| . . . | . . . | . . . | . . . | . . . | . . . | . . . |

The example of Table 5 is recorded with each item of user name, user discriminator, user ID, and address for each user operating a terminal device. The user name is information indicating an appellation of a user operating the terminal device, such as name, address term, and the like. The user discriminators are information indicating the role of the user, and include a first discriminator, a second discriminator, and a third discriminator. The first discriminator is information indicating an attribute of main duties performed by the user, with examples in Table 5 including user of a shop, operator related to tires on group side, manager thereof, and head office manager. The second discriminator is information indicating an individual or a group the user belongs to, with examples in Table 5 including shop or group X. The third discriminator is information indicating a type and level of information to output to the user, with examples in Table 5 including types of MG1 to MG3. The user ID is identification information to identify the user. Address is information indicating an address for when information is output (for example transmitted) to the user. Information that uniquely determines each user is applicable as this address, such as IP address, URL, email address, and the like of the terminal operated by the user.

Moreover, in the present exemplary embodiment, instead of the table illustrated in Table 4 described above, the table indicated by the following Table 6 is pre-stored in the table 55T of the auxiliary storage device 55 of the server 5.

TABLE 6

| | MG1 | MG2 | MG3 |
|---|---|---|---|
| | Instruction Information | | |
| Air pressure (M11) | Please top up internal pressure of target tire | Top up of internal pressure of tire was notified | One instance of tire internal pressure being topped up occurred |
| Air pressure and wear (M31) | Please replace target tire | Tire replacement was notified | One instance of tire replacement occurred |

The example of Table 6 illustrates examples of message information for each user when the tire state has been determined to be an abnormal state when the air pressure (P) has exceeded specific value P0. For example, message information including "Please top up internal pressure of target tire" as message information (instruction information MG1) used for an operator in relation to air pressure abnormality (M11), "Top up of internal pressure of tire was notified" as message information (instruction information MG2) used for a manager, and "One instance of tire internal pressure being topped up occurred" as message information (instruction information MG3) used for the manager.

FIG. 11 illustrates an example of a flow of server processing executed in the server 5 according to the present exemplary embodiment. The processing routine illustrated in FIG. 11 executes processing of step S112 instead of the processing of step S110 (FIG. 10), and executes processing of step S122 instead of the processing of step S120 (FIG. 10).

The CPU 50A, functioning as the acquisition section 500, stands by for data transmission from the shop terminal 3, and then at step S100 executes processing to acquire data configured from the tire related parameter values transmitted from the shop terminal 3. Next at step S112, functioning as the task setting section 502, processing is executed to set instruction information for the acquired data. First, similarly to at step S110 described above, a tire state of the target tire (for example normal state or abnormal state) indicated by the plural tire related parameters is determined. Next, instruction information indicating a task for each user is set according to the determination result. Then at next step S122, functioning as the output section 504, tables of above Table 5 and Table 6 are employed to perform processing to output instruction information to each terminal, namely, to perform processing to transmit instruction information to each of the group-side terminals 4, and the present processing routine is ended.

In this manner, the information processing system 1 of the present disclosure is able to instruct appropriate operation and processing to each of plural user according to the tire state of the target tire. Specifically, messages can be provided that accord with the discriminators set for users, enabling a reduction in information management burden in an information processing system. For example, a reduction in burden on a user is possible compared to performing processing such as notifications independently for each operator, manager, and user.

Other Exemplary Embodiments

In the exemplary embodiments described above cases have been described in which plural tire related parameters are acquired by the server 5 from the shop terminal 3 or from the group-side terminal 4 (the operator terminal 4A), and the server 5 responds with corresponding instruction information. In the technology disclosed herein, information indicating to check and to perform an abnormal determination of the sensor module 22 provided to the tire may be added as this instruction information.

For example, a configuration may be adopted in which the shop terminal 3 or the operator terminal 4A attempts to acquire tire information at a specific cycle from an onboard device of from a sensor module, and information of "check sensor" related to the target tire is employed as instruction information in cases in which such tire information is unable to be acquired, namely in cases in which the tire related parameters corresponding to such tire information are unable to be acquired by the server 5.

Moreover, the instruction information may be set with an output timing for the instruction information and an application timing for the instruction information based on a running schedule of the moving body 2 and on location information of the moving body 2. Specifically, in cases in which the running schedule of the moving body 2 is predetermined, such as for maintenance, the instruction information may be information indicating advance notice at the current abnormal state by requesting tire replacement at the next maintenance time. For example, in cases in which the tire state indicates that the air pressure of the tire is a reducing pressure as a natural phenomenon, the instruction information may be information indicating to top up internal pressure at the next maintenance or at next tire replacement.

Furthermore, in the above description the tire related parameters were acquired by a terminal such as the shop terminal 3, the operator terminal 4A, or the like, and the instruction information was responded to the terminal such as the shop terminal 3, the operator terminal 4A, or the like, however the functions of the terminal such as the shop terminal 3, the operator terminal 4A, or the like may be given to an onboard device of the moving body 2. For example, a terminal function may be given to an onboard device of the moving body 2, such that the tire related parameters are periodically transmitted from the moving body 2 to the server 5. Adopting such an approach enables the instruction information related to the tires mounted to the moving body 2 to be acquired and confirmed at the moving body 2 side.

Although the technology disclosed herein has been described by way of exemplary embodiments, the technology scope of the technology disclosed herein is not limited to the range of the above exemplary embodiments. Various modifications and improvements may be made to the above exemplary embodiments within a range not departing from the spirit, and embodiments incorporating such modifications or improvements are encompassed in the technical scope of disclosed technology.

Moreover, although in the above exemplary embodiments a description has been given of processing performed by executing a program stored on an auxiliary storage device, at least part of the processing of the program may be implemented by hardware. Moreover, the flow of processing of the program as described in the above exemplary embodiments is merely an example thereof, and redundant steps may be omitted, new steps may be added, and the processing sequence may be swapped around within a range not departing from the spirit.

Furthermore, to cause the processing of the above exemplary embodiments to be executed by a computer, the above program may be distributed as a program written with computer executable code stored on a storage medium such as on an optical disk or the like.

Although in the above exemplary embodiments description has been given in which a CPU has been employed as an example of a general purpose processor, in the above exemplary embodiments reference to processor indicates a widely defined processor, and includes general purpose processors (for example, a central processing unit (CPU) and the like), and specialized processors (for example, a graphics processing unit (GPU), an application specific integrated circuit (ASIC), a field programmable gate array (FPGA), a programmable logic device, and the like).

Moreover, operations of the processor in the above exemplary embodiments are not only carried out by a single processor and may be carried out by plural processors coupled together, and may be carried out by plural processors present at physically distinct locations that cooperating with each other.

All publications, patent applications and technical standards mentioned in the present specification are incorporated by reference in the present specification to the same extent as if each individual publication, patent application, or technical standard was specifically and individually indicated to be incorporated by reference. Moreover, the entire content of the disclosure of Japanese Patent Application No. 2022-061174 filed on Mar. 31, 2022, is incorporated by reference in the present specification.

In the technology disclosed herein as described above, a first aspect of the present disclosure is an information processing device including an acquisition section that acquires values of plural tire related parameters related to a structure of a tire attached to a moving body, and a control section that, in cases in which at least one value of the tire related parameters is a specific value predetermined as a tire state indicating a structure of the tire has changed, performs control based on each value of the acquired plural tire related parameters to output instruction information indicating an instruction for the tire predetermined according to the tire state.

A second aspect is the information processing device of the first aspect, wherein the specific value is an abnormal value outside predetermined threshold values for the tire, and in cases in which a value of the tire related parameter is an abnormal value, the control section performs control to output the instruction information associated with the abnormal value.

A third aspect is the information processing device of the first aspect or the second aspect, wherein in cases in which plural values of plural different tire related parameters are each a specific value determined corresponding to the plural tire related parameters, the control section performs control to output the instruction information associated with the different plural tire related parameters.

A fourth aspect is the information processing device of any one of the first aspect to the third aspect, wherein the specific value includes plural determination values of different magnitudes, and the control section performs control for each of the determination values to output the instruction information associated with the respective determination value.

A fifth aspect it the information processing device of any one of the first aspect to the fourth aspect, wherein the tire related parameters include an internal pressure of the tire, or an internal pressure of the tire together with at least one of a rate of pressure drop of internal pressure of the tire, a depth of groove formed in the tire, uneven wear of the tire, a size or depth of a cut occurring in the tire, or valve related information related to a valve attached to the tire.

A sixth aspect is the information processing device of the fifth aspect, wherein the internal pressure of the tire in the tire related parameters is an air pressure of the tire, and the tire related parameters combine air pressure of the tire with uneven wear of the tire, or combine air pressure of the tire with size and depth of a cut in the tire.

A seventh aspect is the information processing device of any one of the first aspect to the sixth aspect, wherein plural different output destinations are predetermined as output destinations to output the instruction information, and the control section performs control to output different instruction information according to the plural different output destinations.

An eighth aspect is an information processing method of processing performed by a computer. The processing includes acquiring values of plural tire related parameters related to a structure of a tire attached to a moving body and, in cases in which at least one value of the tire related parameters is a specific value predetermined as a tire state indicating a structure of the tire has changed, performing control based on each value of the acquired plural tire related parameters to output instruction information indicating an instruction for the tire predetermined according to the tire state.

A ninth aspect is an information processing program that causes processing to be executed by a computer. The processing includes acquiring values of plural tire related parameters related to a structure of a tire attached to a moving body and, in cases in which at least one value of the tire related parameters is a specific value predetermined as a tire state indicating a structure of the tire has changed, performing control based on each value of the acquired plural tire related parameters to output instruction information indicating an instruction for the tire predetermined according to the tire state.

The present disclosure exhibits the advantageous effect of considering plural tire related parameters related to a structure of a tire and being able to provide an appropriate instruction for a tire according to a tire state.

The invention claimed is:

1. An information processing device, comprising:
an acquisition section that acquires values of a plurality of tire related parameters related to a structure of a tire attached to a moving body; and
a control section that, in cases in which at least one value of the tire related parameters is a specific value predetermined as a tire state indicating that a structure of the tire has changed, performs control based on each value of the acquired plurality of tire related parameters to output instruction information indicating an instruction for the tire that is predetermined according to the tire state; wherein
the specific value includes a plurality of determination values of different magnitudes; and
the control section performs control for each of the determination values to output the instruction information associated with the respective determination value.

2. The information processing device of claim 1, wherein:
the specific value is an abnormal value outside predetermined threshold values for the tire; and
in cases in which a value of the tire related parameter is the abnormal value, the control section performs control to output the instruction information associated with the abnormal value.

3. The information processing device of claim 2, wherein:
in cases in which a plurality of values of a plurality of different tire related parameters are each a specific value determined in accordance with the plurality of tire related parameters, the control section performs control to output the instruction information associated with the plurality of different tire related parameters.

4. The information processing device of claim 2, wherein the tire related parameters include:
an internal pressure of the tire; or
an internal pressure of the tire together with at least one of:

a rate of pressure drop of internal pressure of the tire,
a depth of groove formed in the tire,
uneven wear of the tire,
a size or depth or size and depth of a cut occurring in the tire, or
valve related information related to a valve attached to the tire.

5. The information processing device of claim 2, wherein:
a plurality of different output destinations are predetermined as output destinations to which to output the instruction information; and
the control section performs control to output different instruction information in accordance with the plurality of different output destinations.

6. The information processing device of claim 1, wherein:
in cases in which a plurality of values of a plurality of different tire related parameters are each a specific value determined in accordance with the plurality of tire related parameters, the control section performs control to output the instruction information associated with the plurality of different tire related parameters.

7. The information processing device of claim 6, wherein the tire related parameters include:
an internal pressure of the tire; or
an internal pressure of the tire together with at least one of:
a rate of pressure drop of internal pressure of the tire,
a depth of groove formed in the tire,
uneven wear of the tire,
a size or depth or size and depth of a cut occurring in the tire, or
valve related information related to a valve attached to the tire.

8. The information processing device of claim 6, wherein:
a plurality of different output destinations are predetermined as output destinations to which to output the instruction information; and
the control section performs control to output different instruction information in accordance with the plurality of different output destinations.

9. The information processing device of claim 1, wherein the tire related parameters include:
an internal pressure of the tire; or
an internal pressure of the tire together with at least one of:
a rate of pressure drop of internal pressure of the tire,
a depth of groove formed in the tire,
uneven wear of the tire,
a size or depth or size and depth of a cut occurring in the tire, or
valve related information related to a valve attached to the tire.

10. The information processing device of claim 9, wherein:
the internal pressure of the tire in the tire related parameters is air pressure of the tire; and
the tire related parameters combine the air pressure of the tire with uneven wear of the tire, or combine the air pressure of the tire with the size or depth or size and depth of a cut in the tire.

11. The information processing device of claim 10, wherein:
a plurality of different output destinations are predetermined as output destinations to which to output the instruction information; and
the control section performs control to output different instruction information in accordance with the plurality of different output destinations.

12. The information processing device of claim 9, wherein:

a plurality of different output destinations are predetermined as output destinations to which to output the instruction information; and the control section performs control to output different instruction information in accordance with the plurality of different output destinations.

13. The information processing device of claim 1, wherein:

a plurality of different output destinations are predetermined as output destinations to which to output the instruction information; and the control section performs control to output different instruction information in accordance with the plurality of different output destinations.

14. An information processing method for processing performed by a computer, the processing comprising:

acquiring values of a plurality of tire related parameters related to a structure of a tire attached to a moving body; and in cases in which at least one value of the tire related parameters is a specific value predetermined as a tire state indicating that a structure of the tire has changed, performing control based on each value of the acquired plurality of tire related parameters to output instruction information indicating an instruction for the tire that is predetermined according to the tire state; wherein the specific value includes a plurality of determination values of different magnitudes; and the control section performs control for each of the determination values to output the instruction information associated with the respective determination value.

15. A non-transitory computer-readable storage medium storing an information processing program executable by a computer to perform processing, the processing comprising:

acquiring values of a plurality of tire related parameters related to a structure of a tire attached to a moving body; and in cases in which at least one value of the tire related parameters is a specific value predetermined as a tire state indicating that a structure of the tire has changed, performing control based on each value of the acquired plurality of tire related parameters to output instruction information indicating an instruction for the tire that is predetermined according to the tire state; wherein the specific value includes a plurality of determination values of different magnitudes; and the control section performs control for each of the determination values to output the instruction information associated with the respective determination value.

* * * * *